Figure 1:
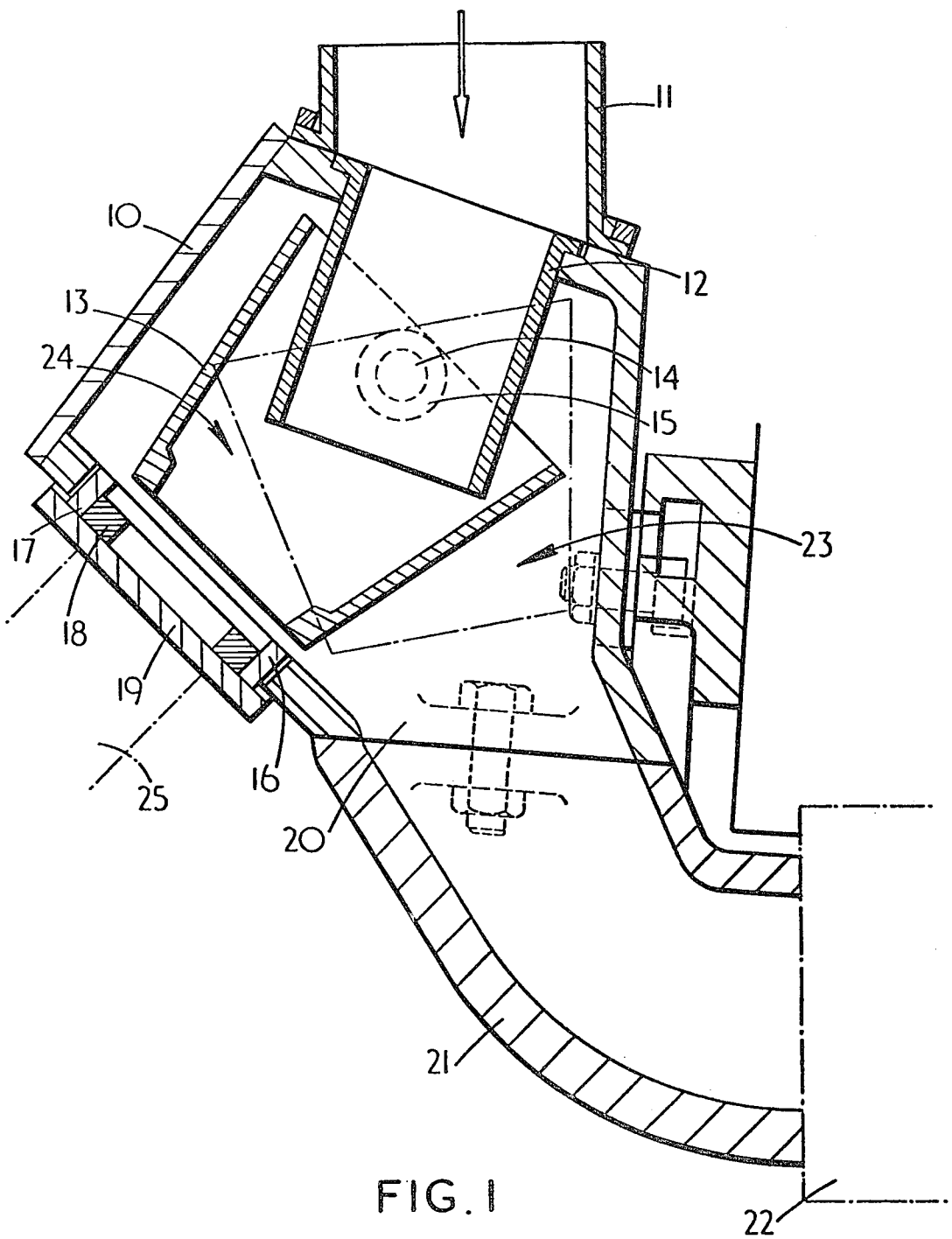

United States Patent [19]

Williams

[11] 4,005,727
[45] Feb. 1, 1977

[54] ABRASIVE CONTROL VALVE

[75] Inventor: Alban Williams, Sale, England

[73] Assignee: Wheelabrator-Frye Inc., Hampton, N.H.

[21] Appl. No.: 653,646

[52] U.S. Cl. .............................. 137/269; 137/612; 251/65; 251/298

[51] Int. Cl.² .......................................... F16K 3/00

[58] Field of Search ............ 137/269, 612, 625.45; 251/65, 298, 301, 303

[56] References Cited

UNITED STATES PATENTS 876,687  1/1908  Brown .............................. 137/612

FOREIGN PATENTS OR APPLICATIONS 1,216,921  12/1970  United Kingdom .............. 137/269

Primary Examiner—Alan Cohan
Assistant Examiner—Gerald A. Michalsky
Attorney, Agent, or Firm—McDougall, Hersh & Scott

[57] ABSTRACT

A flow valve for controlling magnetizable abrasive fed to a centrifugal wheel which includes a tubular valve member pivotally mounted for rocking movement between open and closed position and a magnet disposed adjacent the outlet end of the valve for buildup of magnetizable abrasive when in closed position.

6 Claims, 2 Drawing Figures

ABRASIVE CONTROL VALVE

This invention relates to valves for controlling the flow of abrasive in shot blasting equipment.

In the shot blasting industry, abrasive material, usually magnetizable metal shot, flows from a hopper along a delivery tube to a rotating throwing wheel, which impels the abrasive against the article to be cleaned. The flow of abrasive material is controlled by a valve associated with the delivery tube. Such a valve consists of a plate which can be swung across the delivery tube outlet to close same or to one side of the delivery tube to permit flow to the throwing wheel. Such valves allow the escape of noise from throwing wheels, of such intensity as to be detrimental to the hearing of the operatives, and it is an object of the present invention to provide an improved control valve to reduce this hazard.

According to an aspect of the present invention there is provided a valve for use in controlling the flow of magnetizable abrasive from a supply to a throwing wheel via a delivery tube, the valve being wholly enclosed in a casing communicatingly connecting the delivery tube and a shroud of a throwing wheel.

According to another aspect of the present invention there is provided a valve for use in controlling the flow of magnetizable abrasive from a supply to a throwing wheel via a delivery tube, the valve comprising a casing or delivery tube, defining a flow-through aperture, a movable valve member dimensioned such that, when it is in its valve-closing position, there is a gap between the valve member and casing, and magnetic means operable, when the valve member is in the valve-closing position, to create a collar of magnetizable abrasive in the gap thus to close the valve.

The control valve may comprise a casing with inlet and outlet apertures, disposed intermediate the ends of the delivery tube, a tubular valve member pivotal about a horizontal axis in order to open or close the control valve, abrasive-directing means from the inlet aperture into one end of the valve member, and a magnet disposed in the casing adjacent the other end of the valve member when the valve member is in the valve-closing position.

Preferably, the magnet is a ring magnet.

Preferably, the abrasive directing means is a tube cooperating with the inlet aperture and projecting inwards of the casing into one end of the tubular valve member, the cross-sectional area of the tube being less than that of the tubular valve member.

Preferably, the casing is polygonal shaped with an aperture in a bottom wall, which aperture has an area of the same order to magnitude as said other end of the valve member and in which a metallic ring is fitted, the ring magnet being tightly fitted inside the metallic ring, and a plate covering the metal ring and ring magnet on the outside of the casing.

Preferably, the plate can be removed and a tube fitted to the casing around the aperture through which tube abrasive can be passed to re-cycling means.

Preferably, the tubular valve member is frusto-conical in shape.

Alternatively, the control valve may comprise a magnetic or magnetizable valve member pivotal between a valve-closing position across the delivery tube interior to a valve-opening position alongside the delivery tube, which valve member is of lesser cross-sectional area than that of the delivery tube but which magnetically attracts a collar of abrasive to effect with the valve member closure of the delivery tube.

The delivery tube preferably has a lateral housing for accommodating the valve member when the latter is in its valve opening position.

The top surface of the valve member is preferably lipped so that a layer of abrasive is created across said surface thus assisting in resisting wear.

More specifically, the valve member comprises a magnetic plate sandwiched between two larger plates, all of similar cross-sectional shape to that the delivery tube the bottom plate being larger in area than the top plate and having a slightly smaller cross-sectional area than the delivery tube so that a conical collar of abrasive is formed in the gap between the periphery of the valve member and the tube wall.

Means is preferably provided for pivotting the valve member between horizontal (valve closed) and vertical (valve opened) positions.

Figure 2:
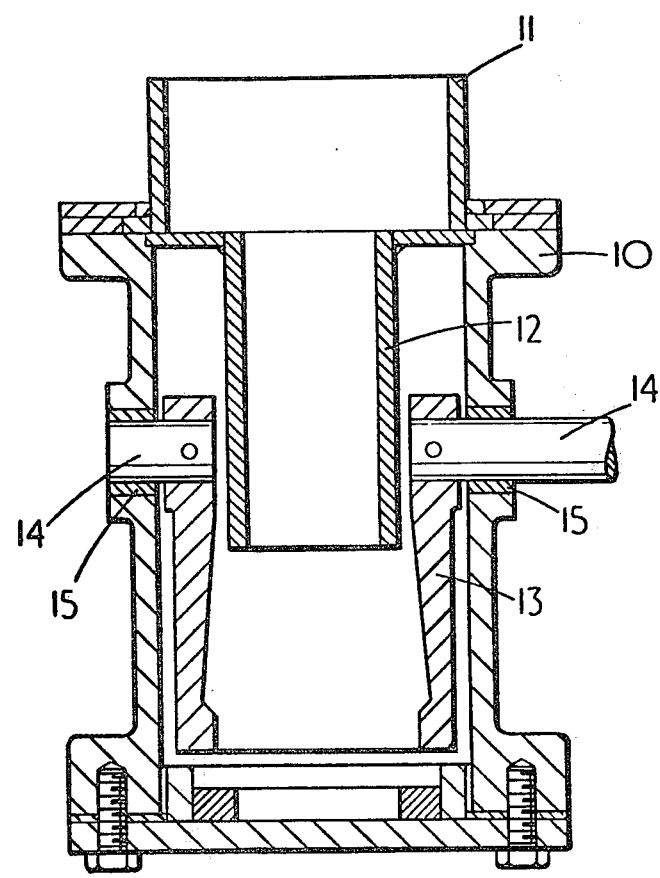

Embodiments of the present invention will now be described by way of example with reference to and as shown in the accompanying drawings, in which:

FIG. 1 is a front sectional view of a first embodiment of control valve according to the invention; and FIG. 2 is a side sectional view of the control valve.

The control valve FIGS. 1 and 2 comprises a polygonal-shaped cast iron casing 10 in which there is an inlet provided at the top to allow the passage of magnetizable abrasive along a vertical tube 11, which is attached to the outside of the casing 10, from a supply. There is another tube 12, of smaller cross-sectional area than that of the tube 11, which projects inwardly of the casing 10 at an angle to the tube 11 into a hollow bucket-shaped valve member 13. The valve member 13 is fixedly mounted on two horizontal shafts 14, which shafts 14 are rotatably mounted in two rubber/metal sandwich bushes 15 in the casing 10, which bushes prevent wear and binding to dust from the metallic abrasive, and reduce friction.

There is provided a large aperture 16 in one of the walls of the casing 10 in which there is fitted an annular metal ring 17 of the same cross-sectional area as the aperture 16. An annular ring magnet 18 is fitted inside the metal ring 17, the outside diameter of the ring magnet 18 being equal to the inside diameter of the metal ring 17. The ring magnet 18 may either be a permanent magnet or an electromagnet. The aperture 16, metal ring 17 and ring magnet 18 are all covered by a plate 19 positioned on the outside of the casing.

There is an outlet 20 provided in the base of the casing 10 which outlet cooperates with a delivery tube 21 attached to the base of the casing 10. The delivery tube 21 is connected at its other end to the center of a shroud 22 of a vertically disposed centrifugal throwing wheel.

In use, metallic abrasive is passed down the vertical tube 11 under the force of gravity into the tube 12. Then, if the valve member 13 is in the open position, (broken lines) 23, the abrasive flows through the hollow valve member 13, through the delivery tube 21 and then into the shroud 22. In order to close the valve, the valve member 13 is rotated via the shafts 14 to the closed position (solid lines) 24 by any kind of motive power or manually. At the same time, the magnet 18, if an electromagnet, is switched on by an operative. In this position 24, a collar of metallic abrasive is formed between the bottom of the valve member 13 and the metal ring 17 and ring magnet 18 preventing any abrasive dropping down the delivery tube 21 to the throwing wheel.

The control valve can be used as a directional valve instead of an open/close valve if required. In this case the plate 19 is removed and a tube 25 leading to re-cycling means is attached to the casing 10 outside of the aperture 16. The metallic abrasive can therefore either pass down the delivery tube 21 to the shroud 22 if the valve member 13 is in position 23, or down tube 25 to re-cycling means, in which it is supercleaned, if the valve member is in position 24.

The control valve has fail-safe means associated with it (not shown) which acts, in the event of a power failure, on the valve member 13 so as to rotate it from the open position 23 to the closed or re-cycled position 24. The shroud 22 and delivery tube 21 are therefore prevented from being blocked with abrasive. The fail-safe means may, for example, be a spring. Rubber/metal sandwich bushes 15 also help to move the valve member from position 23 to 24 since there is a natural elasticity associated with them.

The main advantage of this control valve is that the movement of the valve member from the open to the closed position is much easier than in known valves since the column of shot in the valve member is moved also. In known metallic abrasive control valves, it is necessary to push aside large quantities of abrasive in order to close the valve.

The control valve according to the invention is also easier to close because there is a gap between the bottom of the valve member 13 and the metal ring 17 and ring magnet 18 which is filled by a collar of metallic abrasive as hereinbefore described. Known valves, in their closed position, are a tight fit between the valve member and the casing. Thus, they are difficult to close.

I claim:
1. A valve for use in controlling the flow of magnetizable abrasive from a supply to a throwing wheel via a delivery tube, the control valve comprising a casing, with inlet and outlet apertures, disposed intermediate the ends of the delivery tube, a tubular valve member pivotal about a horizontal axis in order to open or close the control valve, abrasive directing means from the inlet aperture into one end of the valve member and a magnet disposed in the casing adjacent the other end of the valve member when the valve member is in the closed position.

2. A valve as claimed in claim 1, in which the magnet is a ring magnet.

3. A valve as claimed in claim 1, in which the abrasive directing means is a tube cooperating with the inlet aperture and projecting inwards of the casing into one end of the tubular valve member, the cross-sectional area of the tube being less than that of the tubular valve member.

4. A valve as claimed in claim 2, in which the casing is polygonal shaped with an aperture in a bottom wall, which aperture has an area of the same order of magnitude as said other end of the valve member and in which a metallic ring is fitted, the ring magnet being tightly fitted inside the metallic ring, and a plate covering the metal ring and ring magnet on the outside of the casing.

5. A valve as claimed in claim 4, in which the plate can be removed and a tube fitted to the casing around the aperture through which tube abrasive can be passed to re-cycling means.

6. A valve as claimed in claim 1, in which the tubular valve member is frusto-conical in shape.

* * * * *